Sept. 20, 1955　　　　H. BROWN　　　　2,718,306
ORE CONCENTRATORS
Filed April 6, 1953　　　　　　　　2 Sheets-Sheet 1

INVENTOR.
HAROLD BROWN
BY
ATTORNEY

Sept. 20, 1955     H. BROWN     2,718,306
ORE CONCENTRATORS

Filed April 6, 1953     2 Sheets-Sheet 2

INVENTOR.
HAROLD BROWN
BY
ATTORNEY

2,718,306

Patented Sept. 20, 1955

2,718,306

ORE CONCENTRATORS

Harold Brown, Denver, Colo., assignor to Colorado Dry Concentrator Company, a common-law trust Application April 6, 1953, Serial No. 346,862

3 Claims. (Cl. 209—479)

This invention relates to an ore concentrator, more particularly to a device for separating heavy metallic articles from sand or crushed rock. The principal object of the invention is to provide a device of this character which can be used in locations where water is scarce or unavailable, and which will rapidly and efficiently separate the metallic values from gangue or sand without the use of water.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

Figure 1:
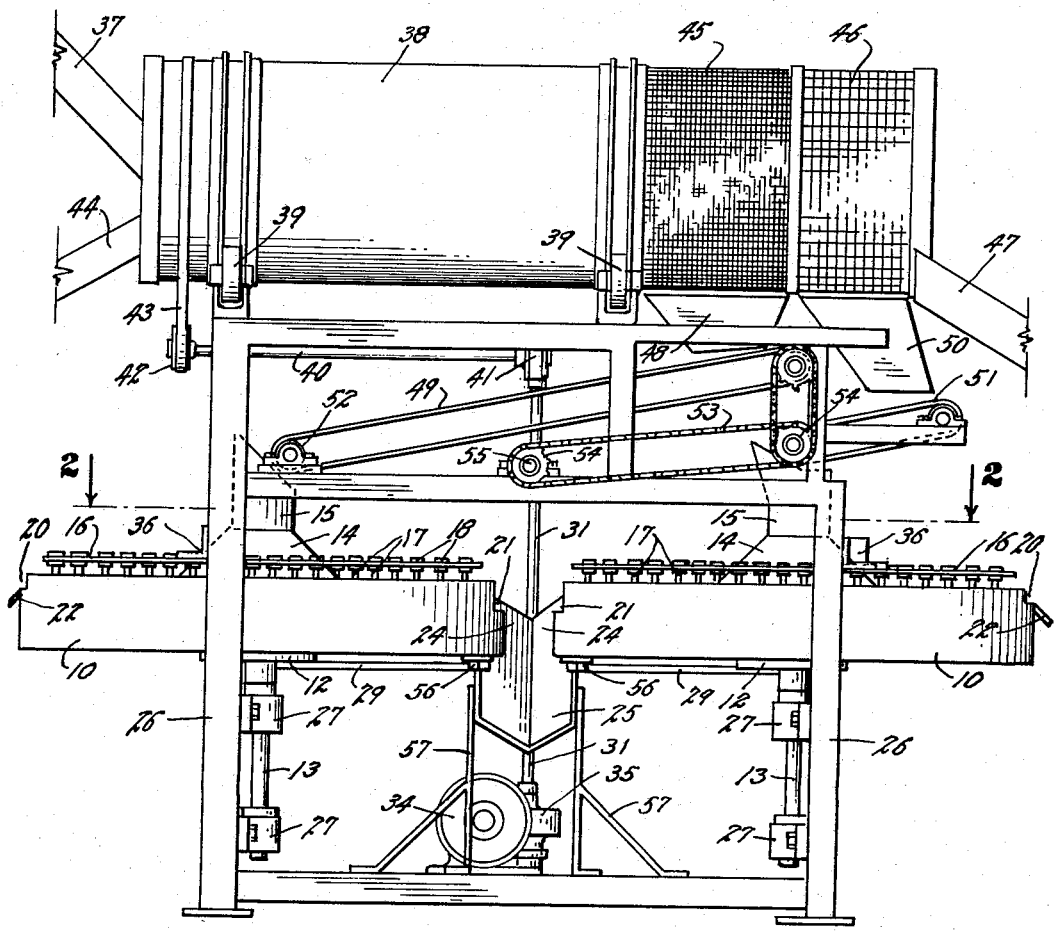
Fig. 1 is a side elevation of the improved ore concentrator.
Figure 2:
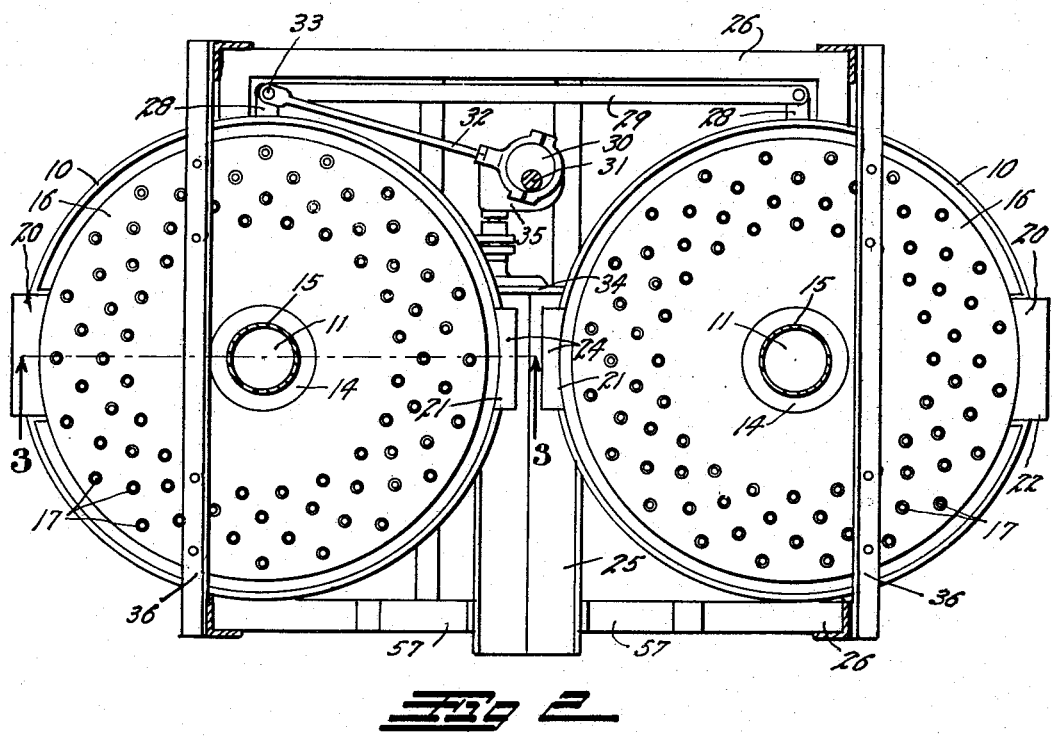
Fig. 2 is a horizontal cross-section therethrough, looking downwardly on the line 2—2, Fig. 1.
Figure 3:
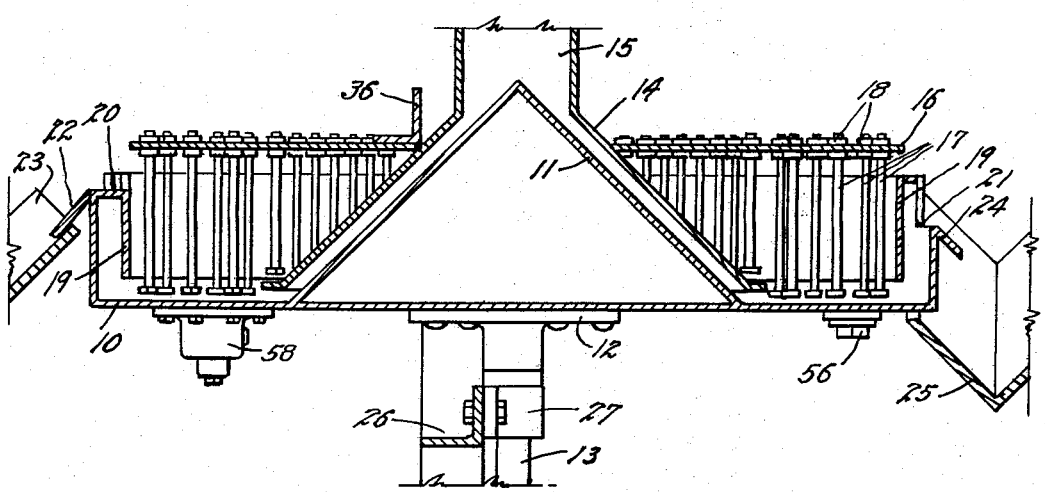
Fig. 3 is an enlarged, detail section, taken on the line 3—3, Fig. 2.

The principal feature of the improved ore concentrator is illustrated in Fig. 3 and comprises an oscillating outer pan 10 provided with a concentric inner cone 11. The pan 10 is fixedly mounted on a suitable shaft collar 12 carried on the upper extremity of a pan shaft 13, and the cone is fixedly mounted in the center of the pan. During operation, the pan 10 is constantly oscillated back and forth about its axis by any suitable mechanism, one of which will be later described.

A conical hood 14 is fixedly supported over the cone 11 in relatively close, uniform, spaced relation to the latter, and the material to be treated is fed between the cone 11 and the conical hood 14 from a central feed stack 15. The hood 14 terminates above the bottom of the pan 10 so that the material flowing downwardly over the cone 11 will be spread in a relatively thin, uniform layer over the bottom of the pan.

An agitator disc 16 is welded or otherwise secured to the hood 14 and concentrically surrounds the latter above the pan 10. A plurality of agitator elements 17 are fixedly mounted in the disc 16 and extend downwardly into the pan 10, terminating in close proximity to the bottom thereof. These agitator elements may be of any desired type. A convenient form of element has been found to be ordinary elongated machine bolts, with their heads positioned in the pan and fixed to the disc 16 by means of clamping nuts 18. An annular partition member 19 is supported from the peripheral edge of the pan 10 and extends downwardly into the latter in spaced relation to the side wall thereof. The partition member 19 terminates in close spaced relation to the bottom of the pan.

One side of the pan 10 is provided with a notched overflow passage 20 communicating from the area inside of the partition member 19 outwardly over the edge of the pan 10. The pan is also provided with a value overflow notch 21, the bottom of which is at a lower elevation than the overflow passage 20. The notch communicates with the annular space surrounding the partition member 19. Suitable chutes 22 and 23 may be provided for conveying material from the overflow passage 20, and suitable chutes 24 and 25 convey the material overflowing from the overflow notch 21.

Let us assume that a continuous stream of crushed rock or sand carrying metallic values is fed down the stack 15 onto the cone 11. The stream will be spread into a thin, conical, descending layer. The density of the layer will decrease as the bottom of the cone is approached due to the increasing diameter of the cone. This decreasing density will tend to separate the grains of the material, allowing open interstices through which the heavier grains may descend to a lower elevation than the lighter grains.

The weight of the descending material and the constant oscillation of the pan causes the material to flow radially outward from the cone toward the periphery of the pan. During this outward flow, the heavier particles will gradually gravitate to the bottom of the pan, their weight forcing the lighter particles toward the top of the pan. The descent of the heavier particles and the rise of the lighter particles is constantly facilitated by the fact that the bed of sand is constantly passing back and forth past the stationary agitator elements 17, which keep the bed in a constant state of agitation.

The weight of the incoming material will gradually fill the pan until the uppermost or lightest layer of waste material will overflow through the passage 20. The heavier more valuable material will gradually build up between the partition member 19 and the wall of the pan until it also overflows through the value overflow 21. Thus, a constant separation or classification between the lighter, non-metallic particles and the heavier, metal-bearing particles is constantly obtained.

The above-described separating pan may be mounted for use in many ways. As illustrated, two of the pans 10 are mounted in a suitable supporting frame 26 with their shafts 13 carried in vertical bearings 27 secured to the frame 26. Each pan 10 is provided with a rearwardly extending crank arm 28, and the two crank arms 28 are connected together by means of a connecting link 29. The link 29 and the two pans are oscillated back and forth from an eccentric 30 mounted on a vertical shaft 31. A connecting rod 32 extends from the strap of the eccentric 30 to a crank pin 33 on the connecting link 29. The vertical shaft 31 is rotated from a motor 34 through a reduction gear set 35.

Thus, it can be seen that as long as the motor is operating, the two pans 10, with their internal cones 11 and partition members 19, are constantly oscillating back and forth beneath their discs 16. The disc 16 of each pan is rigidly supported from the frame 26 by means of suitable cross frame members 36 so that they are maintained in rigid, concentric relation with their respective pans.

The material to be treated is fed to the machine from a feed chute 37 which delivers the material into a rotating drying and agitating drum 38. The drum 38 is supported upon suitable rollers 39 mounted on the top of the frame 26. The drum is rotated from a countershaft 40 which is driven through any conventional worm gear set 41 from the vertical shaft 31. The counter-shaft carries a belt sheave 42 from which an endless belt 43 extends about the drum 38. Heat is furnished to the drum in any desired manner, such as through a hot air duct 44.

The discharge extremity of the drum 38 supports a fine trommel screen 45, and the discharge extremity of the screen 45 supports a coarse trommel screen 46. The screens, of course, rotate with the drum, and the material which will not pass through either screen is discharged from the open extremity of the screen 46 into an oversize chute 47.

The fine material passing through the screen 45 is directed by means of a receiving chute 48 to an upper conveyor belt 49, and the material passing through the screen 46 is directed by a similar receiving chute 50 to a lower conveyor belt 51. The conveyor belt 49 discharges over a magnetic pulley 52 into the central feed stack 15 of one of the pans, and the belt 51 discharges over a similar pulley into the feed stack 15 of the other pan.

The belts 49 and 51 are driven through the medium of suitable transmission chains 53 and sprockets 54 from a second counter-shaft 55. The second countershaft 55 takes its power from the vertical shaft 31 through the medium of bevel gears (not shown), or in any other desired manner.

Operation

Crushed rock or sand carrying metallic values is constantly fed into the drum 38 and, if damp, is tumbled in this drum in a blast of hot air to remove all moisture. The tumbling sand gradually travels to the screen 45, and the fines fall therethrough. The coarser material travels to the screen 46 and falls therethrough. The oversize material discharges into the chute 47 for regrinding.

The sand that has passed the screens is continuously fed into the feed stacks 15 of the pans and travels through the pans as previously described, with the heavier material settling and the lighter material rising. The lighter material discharges over the chutes 22 and 23 to waste. The material carrying the metallic values discharges over the overflows 21 into the receiving chute 25 and is retained for further treatment.

Drain plugs 56 are preferably positioned in the bottoms of the pans for a final clean-up when the machine is closed down.

It has been found that the capacity of the concentrator can be greatly increased by providing some means for vibrating the outer pans 10. This can be accomplished in any way, such as by mounting an electromagnetic vibrator 58 upon the bottom of each pan, as shown in Fig. 3. The vibration assists in opening up the spaces between the grains to allow the lighter material to rise in the pans.

While a specific form of the improvement has been described and illustrated herein, it is to be understood that the same may be varied, within the scope of the appended claims, without departing from the spirit of the invention.

Having thus described the invention, what is claimed and desired secured by Letters Patent is:

1. An ore concentrator comprising: a supporting frame; a vertical shaft rotatably supported in said frame; a horizontal circular pan bottom concentrically mounted on the upper extremity of said shaft; a vertical annular pan wall sealed to and arising from the periphery of said pan bottom; an inner cone with its base secured upon said pan bottom and arising concentrically therefrom; a hollow outer conical hood in axial alignment with and surrounding said inner cone in relatively close, uniform spaced relation to the entire conical surface of said inner cone and having its base positioned above and in close proximity to said bottom so as to form a conical feed passage about said inner cone having an annular discharge between the base of said hood and said pan bottom; an axially positioned feed stack entering the top of said hood over the apex of said inner cone; means supporting said hood from said supporting frame in fixed relation to said inner cone; means for reciprocally rotating said shaft and said pan bottom to cause material flowing down said conical passage to spread radially upon said pan bottom to said pan wall so as to build up against the latter; and a value overflow formed in said wall elevated above said pan bottom through which the built up material may discharge.

2. An ore concentrator as described in claim 1 having an annular partition member supported from and within said pan wall in uniform relatively-close spaced relation to the latter to form an annular riser passage immediately within said pan wall, said partition member terminating above said pan bottom to allow material spreading radially from said conical passage to flow uninterruptedly along said pan bottom to said pan wall; and a waste overflow passage communicating from within said partition through said annular riser passage to the exterior of said pan wall, said waste overflow passage being at a higher elevation above said pan bottom than said value overflow.

3. An ore concentrator as described in claim 2 having: an agitator disc secured to and surrounding said hood above said pan wall; and a plurality of agitator elements mounted in and extending downwardly from said disc and terminating above said pan bottom, so that as said pan bottom is reciprocally rotated the material therein will be dragged past said elements for agitation purposes.

References Cited in the file of this patent

UNITED STATES PATENTS

| 1,470,011 | Johnesse | Oct. 9, 1923 |
| 2,484,203 | Beck | Oct. 11, 1949 |